United States Patent [19]

Penoyer

[11] Patent Number: 4,942,000

[45] Date of Patent: Jul. 17, 1990

[54] CONTACTLESS KNURLING PROCESS FOR WINDING OF HIGH MODULUS THERMOPLASTIC FILMS

[76] Inventor: John A. Penoyer, 106 Sturbridge Dr., Greenville, S.C. 29607

[21] Appl. No.: 891,937

[22] Filed: Jul. 30, 1986

[51] Int. Cl.$^5$ .................. B29C 35/10; B29C 71/04
[52] U.S. Cl. ........................... 264/22; 101/17; 101/32; 219/121.66; 219/121.72; 219/121.73; 219/121.79; 264/25; 264/40.1; 264/132; 264/210.2; 264/284; 427/53.1; 427/54.1; 427/177; 427/284; 428/157; 428/192
[58] Field of Search .............. 264/22, 40.1, 40.7, 264/132, 210.2, 25, 210.3, 284; 427/54.1, 177, 284, 53.1; 101/17, 32; 428/157, 192, 220; 219/121.66, 121.72, 121.73, 121.79

[56] References Cited

U.S. PATENT DOCUMENTS

| | | |
|---|---|---|
| 2,271,192 | 1/1942 | Hinz . |
| 2,729,267 | 1/1956 | Walton ................. 264/284 X |
| 3,061,886 | 11/1962 | Seager et al. . |
| 3,261,903 | 7/1966 | Carr . |
| 3,502,765 | 3/1970 | Spencer ................. 264/284 X |
| 3,529,785 | 9/1970 | Mistele . |
| 3,536,273 | 10/1970 | Hawkins ................. 242/56.7 |
| 3,626,143 | 12/1971 | Fry . |
| 3,627,858 | 12/1971 | Parts et al. . |
| 3,707,431 | 12/1972 | Whitfield, Jr. . |
| 3,781,214 | 12/1973 | Nemoto et al. ............. 264/22 X |
| 3,790,744 | 2/1974 | Bowen . |
| 3,842,152 | 10/1974 | Whitfield, Jr. et al. . |
| 3,873,664 | 3/1975 | Curtis et al. ................. 264/146 |
| 4,018,947 | 4/1977 | Stone, Jr. ................. 427/284 |
| 4,092,518 | 5/1978 | Merard . |
| 4,141,735 | 2/1979 | Schrader et al. . |
| 4,226,825 | 10/1980 | Yamagisi et al. .......... 264/284 X |
| 4,234,300 | 11/1980 | Yamagisi et al. .......... 264/284 X |
| 4,304,750 | 12/1981 | Pira et al. ................. 264/284 |
| 4,307,047 | 12/1981 | Edinger et al. ............ 264/132 X |
| 4,380,945 | 4/1983 | Guild et al. ................. 83/482 |
| 4,398,678 | 8/1983 | Kron et al. ................. 242/56.3 |
| 4,536,468 | 8/1985 | Yasui et al. .............. 427/54.1 X |
| 4,598,877 | 7/1986 | Oinonen ................. 242/66 |

FOREIGN PATENT DOCUMENTS

| | | | |
|---|---|---|---|
| 2801191 | 7/1979 | Fed. Rep. of Germany ...... 428/157 |
| 3247795 | 6/1984 | Fed. Rep. of Germany ........ 264/22 |
| 50-36459 | 11/1975 | Japan ................. 264/22 |
| 54-28781 | 3/1979 | Japan . |
| 6603002 | 9/1966 | Netherlands ................. 264/284 |

OTHER PUBLICATIONS

Kuhn, L. et al., "Ink-Jet Printing", Scientific American, vol. 240 (Apr. 1979), pp. 162–178.
"Imprinting, Non Contact", Packaging Encyclopedia & Yearbook 1985, vol. 30, No. 4–pp. 224, 225.
E. Galli, "Film Winders: Life in the Fast Lane", *Plastics Mach. & Equipment* 17 (May 1984).
"Hot Knurling Apparatus with Back-Up Roll Protection", *Research Disclosure* 21801 (Jun. 1982).

*Primary Examiner*—Jeffery Thurlow
*Assistant Examiner*—Leo B. Tentoni

[57] ABSTRACT

A contactless method for knurling thermoplastic film to improve its winding characteristics is disclosed. A preferred embodiment employs an ink jet printer to intermittently deposit ink upon at least one margin of the moving film surface. A second preferred embodiment employs a laser to intermittently modify at least one margin of the moving film surface. The invention eliminates the problem of stress gradient during web transport prior to winding which is inherent in contact knurling and particularly troublesome in the manufacture of high modulus, relatively thin thermoplastic films.

12 Claims, No Drawings

CONTACTLESS KNURLING PROCESS FOR WINDING OF HIGH MODULUS THERMOPLASTIC FILMS

BACKGROUND OF THE INVENTION

This invention relates to a method for contactless knurling of high modulus thermoplastic films, such as polyester and polyimide. In a preferred embodiment, fast drying ink is intermittently deposited onto the margin of the moving film surface prior to winding. In another preferred embodiment, a laser is employed to intermittently modify the margin of the moving film surface prior to winding.

The manufacture of high modulus thermoplastic film webs is well known. For example, polyethylene terephthalate film is made by first extruding molten polyethylene terephthalate resin through a slotted die to form a cast melt of polyethylene terephthlate. The melt is quenched on a casting drum to produce a cast sheet. The cast sheet is biaxially stretched in the longitudinal and transverse directions to form a film. The amount of stretching imparted to the film in these two perpendicular directions is a function of the desired tensile properties that the manufacturer wishes to impart to the film. The biaxially drawn film is thereafter heat set at elevated temperatures to relax and crystallize the film and thus impart to the film the desired thermal stability. The film is immediately cooled after heat setting and, after trimming the margins, is wound on to a mill or master roll. The master roll is usually slit into standard width films. These films are rolled to form "slit rolls." In most cases, the slit rolls are stored and/or shipped prior to use.

For many applications the surface characteristics of a thermoplastic web are critically important. Perhaps equally important is the uniformity of the film thickness and the uniformity of its surface characteristics. Unfortunately, the high speed winding operations performed at the end of high modulus film manufacture can degrade the quality of the film due, in part, to the sheet deformation and surface scratching associated with high modulus films such as polyesters and polyimides.

When a thermoplastic web such as polyethylene terephthalate is being wound, the goal is to produce an "ideal film roll", defined as a perfect right circular cylinder having a firm, uniform pressure distribution throughout the roll. The individual film layers of an ideal film roll are stacked so that their edges present flat and smooth surfaces on both ends of the roll. The face of an ideal film roll does not exhibit the commonly encountered "non-ideal" web characteristics such as "gauge bands", "cross buckles", "honeycomb", "pimples", "shifted layers", and "telescoping". These terms are defined below:

Gauge Bands - Variations in web thickness as measured transverse to the "machine" or length direction, of the film web which induce non-uniform pressures in a wound roll of film.

Cross-buckles - Patterns of flat or non-uniform curvature on the surface of a roll of film extending along axial direction and accompanied by corresponding pressure gradients in the circumfirential and radical directions.

Honeycomb - Patterns of non-uniform smoothness and pressure distribution resembling chicken wire. This pattern can exist on the surface or be hidden below the surface layers. It can occur at the time of winding or develop with time as entrained air escapes to reveal a non-uniform pressure distribution.

Pimples - Localized hard spots, generally round in shape, and varying in height and diameter according to severity. Sometimes originated by winding a particulate contaminate between layers of film. Subsequent layers often tend to distort due to the localized non-uniform pressure resulting in the "Pimple" defect.

Shifted layers - Term applied to individual or groups of film layers whose margins protrude from the edge surface of a roll of film. Shifted layers often occur due to a momentary pulse in the winding tension magnitude or direction.

Telescoped roll - A roll of film having a portion of its layers systemmatically shifted axially away from a perfectly stacked configuration. This defect can occur during winding or during handling subsequent to winding. It predominates in rolls of film wound with low radial pressures and having low surface friction. A smooth and uniformly tapered crossweb thickness profile increases the tendency for a roll to telescope during winding.

Painstaking process control, especially with respect to film width gauge uniformity, can eliminate or significantly reduce the occurrance and severity of the non-ideal film web characteristics listed above. Post-winding heat treatment, as described in U.S. Pat. No. 3,873,664, can also minimize sheet deformations due to winding of high modulus thermoplastic films.

Film manufacturers have also intentionally modified the film surface to improve the winding characteristics of the film. In particular, the outermost (⅛ to ½ inch wide) margins of the film web have been embossed ("knurled") to prevent the "shifted layers" phenomenon. Contact knurling is typically produced by means of a circular metal roller in rotating contact with the margin of the moving film web. The roller typically has small protrusions facing radially outward and regularly spaced about the circumerference of the roller. A second, rubber-faced roller is in rotating contact with the opposite film surface directly under the knurling roller. A line of spaced indentations is produced in the film margin as it passes the rotating knurling roller. These indentations serve to minimize the shifted layers phenomenon during winding by lining up and engaging with the indentations of previously wound film. Perfect alignment of the indentations is impossible due to the knurling patterns selected and the increased radius of each succeeding layer. The knurled indentations which do not firmly engage themselves with an earlier wound film surface indentation create passageways by which entrained air may escape from the film roll. They also form a region of high pressure contact at the margins of a roll. This promotes conformity of web surfaces within the roll during winding.

The above-described contact knurling process is acceptable for relatively thick high modulus films (0.002 inch and above); it is unsuitable for thinner gauge films. The rotating knurling and rubber wheels typically introduce a stress gradient across the width of the film. While this stress gradient does not adversely affect a thick film, such stress can significantly deform a thin film, thereby creating additional winding problems. Other problems with knurling include debris formation and contamination of the film web surface, and the necessity for precise control and alignment of the knurling apparatus.

BRIEF SUMMARY OF THE INVENTION

In one aspect, the present invention is a process for improving the winding characteristics of a thermoplastic film web comprising modifying the surface of at least one margin of said film web on an intermittent basis by means for film surface modification which do not contact the surface of said film web such that the thickness of the film which has been surface-modified is greater than the thickness of the film which has not been surface-modified by an amount effective to improve the winding characteristics of the film.

In another aspect, the present invention is a thermoplastic film web having superior winding characteristics whose surface has been modified on at least one margin by contactless knurling.

DETAILED DESCRIPTION OF THE INVENTION

As summarized above, the present invention is directed to an improved form of knurling a moving film surface without physically contacting the surface of the film. It is believed that contactless knurling of thermoplastic film will permit high speed winding of high modulus film without creation of a stress gradient across the web width and without significant film degradation or contamination.

By "high modulus film" it is meant those films which possess a relatively high tensile modulus in comparison to the compressive modulus of stacked layers of the film. A relatively low modulus film possesses a tensile modulus which is roughly the same magnitude as its compressive modulus. Polyesters and polyimides are two examples of high modulus films, while polyolefin films typically possess low modulus.

By "contactless knurling" it is meant any intermittent surface modification of at least one margin of a moving thermoplastic film, intended to improve the winding characteristics of the film, which does not comprise physically contacting the film surface with the actual means for surface modification. Contact knurling surface modification is expressly outside the scope of this definition.

A preferred embodiment of the present invention employs a conventional ink jet printer as the means for surface modification of the film surface. Ink jet printing is a form of dot matrix printing, in which a stream of ink issuing from a microscopic nozzle is broken up into small droplets which are directed to specified positions on the printing medium. The basic theory and operation of ink jet printers is more fully described in Kuhn and Myers, *Ink-Jet Printing*, 240 Scientific American 162 (1979), the disclosure of which is hereby incorporated by reference in its entirety.

The ink jet printer may be of any conventional design and should be adapted, preferably using computer control, to direct its ink droplets along the margin of the travelling film surface. The operation of the ink jet printer could be coordinated with film thickness information to compensate for any unintentional fluctuation in film thickness to ensure that the printed margins on each side of the film web would contribute "balanced edges" of substantially equal thickness. Preferably, the ink jet printing apparatus may be located where the contact knurling apparatus would typically be located e.g. adjacent to a tenter exit or adjacent to an unwinding stand or slitter.

In this preferred embodiment of the present invention, only the ink droplets actually contact the film surface. The means for film surface modification (i.e. the ink jet printer) does not physically contact the film surface.

Film processing speeds, the available length of web between the point of ink application and the next point of film contact with another surface, and ink adhesion to the film web will determine the types of inks which may be employed in the present invention since the ink must dry and harden upon the film surface prior to being wound. Therefore, the faster the film line speed, and the shorter the film path prior to further contact, the faster the ink must dry. Ink drying time may be reduced by applying heat, ventilation, or both. Generally, it is believed that an acceptable drying time would be shorter than 5 seconds, preferably shorter than 2 seconds. If the ink jet printer is adjacent the unwinding stand/slitter, a drying time of 1 second or less may be required due to the shorter non-contacting web path typically found in such locations.

In addition to possessing rapid drying properties, the ink must adhere to the thermoplastic film surface. Preferably, the surface of the margin of the film may be modified by electric corona discharge or other surface modification prior to ink deposition in order to enhance the adhesion of the ink to the film surface. The ink should preferably dry tack-free so it does not tend to restrict unwinding of film from the roll.

Other constraints which may limit the number of acceptable inks include the ink's effect on film reclaimability and compatability with customer coating formulations and processing criteria. The ink can be opaque, colored or transparent, and it may contain fluorescent pigments.

Inks which are believed to have adequate adhesion to various thermoplastic webs and to possess an acceptably short drying time include solvent-based and high solids UV-curable inks, which are typically employed in ink-jet printing applications. One UV-curable ink of particular interest is commercially available from American Technologies, Inc., Neenah, Wisconsin, under the trademark AMJET W-1210. Solvent-based inks which possess rapid drying times include VIDEOJET 16-7800, 16-8100 and 16-8200, all of which are commercially available from Videojet Systems International, a division of A. B. Dick Company, 2200 Arthur Avenue, Elk Grove Village, Ill. 60007.

Contact knurling, commonly used with heavy gauges of biaxially oriented polyethylene terephthalate film having a thickness of from 50 to 350 microns, will typically produce a embossment which increases the measured thickness of the film by 5 to 20 percent. This thickness difference is known as the "knurl height" and can be adjusted to partially compensate for unintentional differences in average film sheet thickness from one margin to the other of a winding web, by adjusting the pressure exerted on the film by the knurling wheel. The embossing pattern can also be changed by replacing the knurling wheel with another wheel having a different pattern. It is relatively cumbersome to adjust the knurling pattern since the knurling apparatus or head must be moved away from the film, the knurling wheel replaced, and the knurling apparatus realigned.

In sharp contrast, the contactless knurling method of the present invention preferably permits rapid, precise, and convenient control of the "knurl height" on thinner films in the thickness range 5 to 50 microns. For example, conventional ink jet printers can rapidly change the characters they are printing as well as the typeface itself. The "knurl height" of the ink droplets may also be adjusted from 0.5 to 5.0 microns. The actual amount of ink required to achieve a "knurl height" which is effective to influence the winding characteristics of the film will depend on a variety of factors including printed patterns, film speed and film modulus, and may be easily empirically determined by one of ordinary skill in the film manufacturing art.

It is important that the contactless surface modification of the present invention be intermittent rather than continuous. The spaces between individual, discrete surface modifications permit air which has been entrained into the rolled web during winding to escape from the film roll. The distance between discrete modifications may vary with the film speed, embossing pattern, and the effective knurl height of the surface modification. The actual distances between discrete surface modifications may be about the same for typical separations produced by contact knurling. For polyethylene terephthalate film which is being wound at a speed of about 1,000 feet per minute with a contact knurling pattern having an effective height of 0.3 mil, the separation between embossments is about ⅛ inch.

In addition to the primary winding advantages inherent in contactless knurling, the preferred embodiment which employs ink jet printing also permits the film manufacturer to easily put information on his product. For example, the knurling pattern could be the lot numbers, footage markings, or manufacturer's name and/or product designation:

"American Hoechst Corporation Hostaphan ® Type 2500 Polyester Film"

The knurling pattern could also be easily changed during winding operations to indicate the end of a roll:

"300 Feet or Less"

A second preferred embodiment of the present invention employs a laser, rather than an ink jet printer, to intermittently modify the margin of the moving film surface prior to winding. The protrusions produced by laser printing are localized thermal distortions of the base film due to the partial absorption of the concentrated light (which is converted to thermal energy) of the laser by the film, and could be either actual perforations of the film margin with an associated bead or melt pool surrounding each perforation, or laser printing. The "knurl height" of the protrusion can be adjusted by adjusting the intensity of the laser.

In this second preferred embodiment of the present invention, only the laser electromagnetic radiation impinges upon the film surface. The means for film surface modification (i.e. the laser printer) does not physically contact the film surface.

Different types of lasers exhibit different wavelengths. The effect of the laser energy will depend on the absorption characteristics of the thermoplastic film at the wavelength of the laser. Polyester film will absorb the 10.6 micron wavelength of the carbon dioxide laser more efficiently than the 1.06 micron wavelength of the Yttrium/Aluminum Garnet ($Y_3Al_5O_{12}$) laser, also known as a YAG laser. Preferential absorption of a thermoplastic film can be predicted by inspection of an infrared spectrograph of the film, which can be used to select and predict laser heating effects according to wavelength.

The laser printer may be located where the contact knurling apparatus would typically be located e.g. adjacent to the tenter exit or adjacent to an unwinding stand or slitter. By using different light masks, different knurling patterns can be "printed" upon the film surface. Preferably, operation of the laser is controlled by computer, which may permit rapid alteration of the knurling pattern and winding characteristics of the film without interruption of the film manufacturing or slitting operation.

Both continuous wave and pulsed lasers may be operable in the present invention. A continuous wave (cw) laser typically comprises a laser light source in cooperating relationship with lenses and/or mirrors which direct the light beam in the desired manner. For example, the laser light beam may be passed through an upcollimator which enlarges the beam diameter (for example, by 2–3x). The enlarged beam is subsequently deflected by two pivotable elliptical dielectric mirrors which are arranged so that one mirror controls the x-axis deflection of the beam and the other mirror determines the y-axis deflection of the beam. Each mirror is turned by a galvanometer mechanism, which may preferably be under computer control.

The laser light beam may then be directed through a fixed, flat-field lens, which focusses the beam on the surface plane of the thermoplastic film, causing the laser beam to impinge upon the film normal to the film surface. Intermittent impingement may be achieved by deflecting the laser beam completely away from the film surface, or by means of a rotating mirror or similar beam "chopper".

A continuous wave laser printing system which employs the general theory of operation just described is commercially available from Control Laser Corporation, 11222 Astronaunt Blvd., Orlando, Fla. 32821 under the trademark INSTAMARK.

Both preferred embodiments of the present invention eliminate the stress gradient problem of contact knurling. Secondary advantages of contactless knurling include rapid knurling pattern changes and reduction or elimination of debris formation and resultant film contamination.

I claim:

1. A process for improving the winding characteristics of a thermoplastic film comprising modifying the surface of at least one margin of said film on an intermittent basis by means for film surface modification which do not contact the surface of said film web such that the thickness of the film which has been surface-modified is greater than the thickness of the film which has not been surface-modified by an amount effective to improve the winding characteristics of the film.

2. The process of claim 1 wherein opposing margins of the same surface of said film are modified to improve the winding characteristics of the film.

3. The process of claim 1 wherein said process is performed during manufacture of the film after it emerges from a film tenter apparatus.

4. The process of claim 3 wherein said process is performed just before the film is wound into a roll.

5. The process of claim 1 wherein said means for film surface modification comprise an ink jet printer.

6. The process of claim 5 wherein said ink jet printer is computer controlled.

7. The process of claim 5 wherein UV-curable ink is employed in said ink jet printer and a UV lamp is employed to dry said ink on said film.

8. The process of claim 7 wherein said UV-curable ink possesses a drying time of less than 2 seconds at room temperature under a 200 watt/square inch focussed UV lamp.

9. The process of claim 1 wherein said means for film surface modification comprise a laser.

10. The process of claim 9 wherein said laser is a pulsed carbon dioxide laser.

11. The process of claim 9 wherein said laser is a continuous wave laser.

12. The process of claim 1 wherein said film has a nominal thickness 5 to 50 microns.

* * * * *